May 31, 1938. C. C. SUNDERLAND 2,119,366
METHOD OF AND APPARATUS FOR CONSTRUCTING SUSPENSION CABLES
Filed Jan. 12, 1937 7 Sheets-Sheet 1
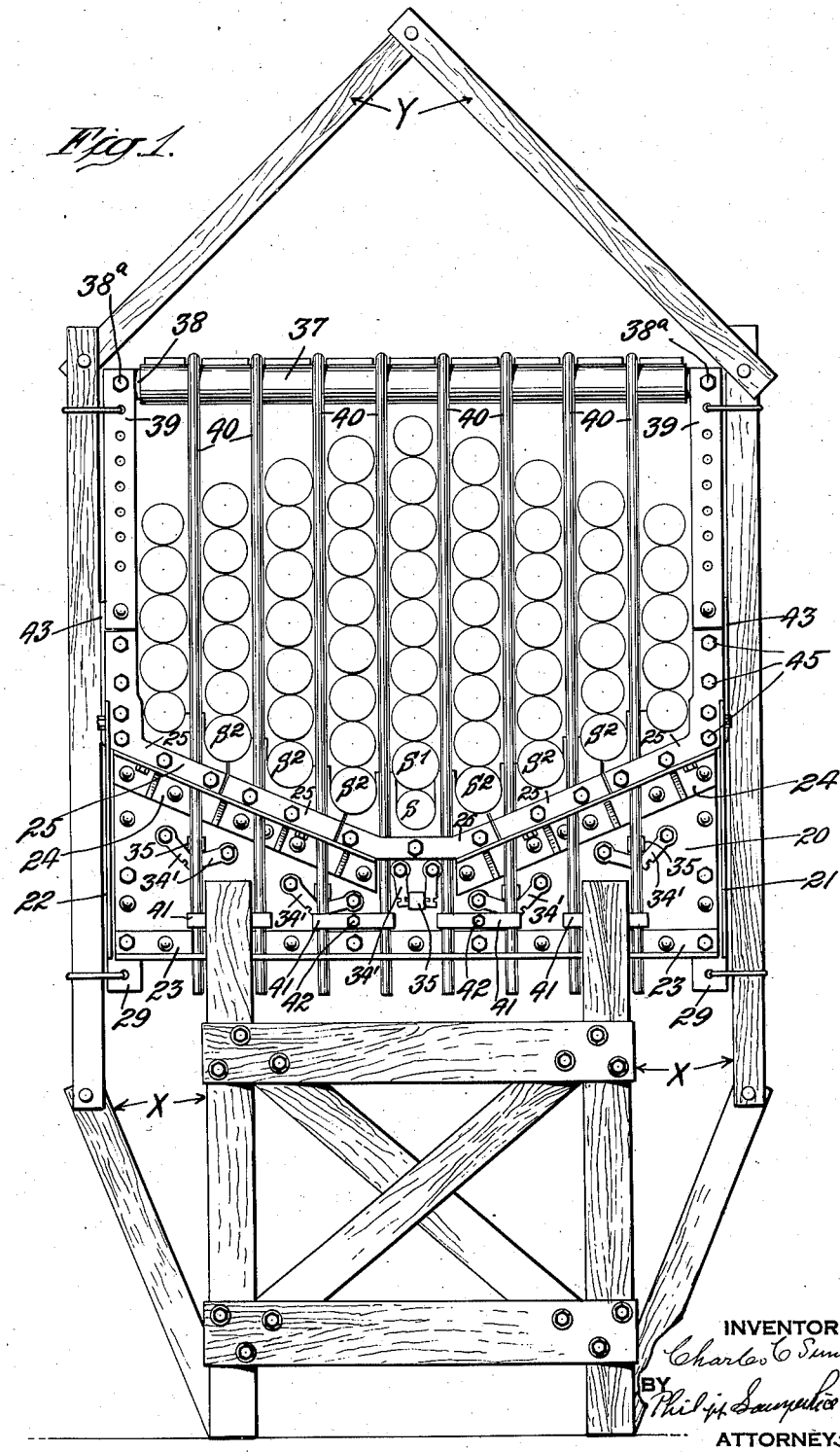
INVENTOR
Charles C Sunderland
BY
ATTORNEYS May 31, 1938. C. C. SUNDERLAND 2,119,366
METHOD OF AND APPARATUS FOR CONSTRUCTING SUSPENSION CABLES
Filed Jan. 12, 1937 7 Sheets-Sheet 2
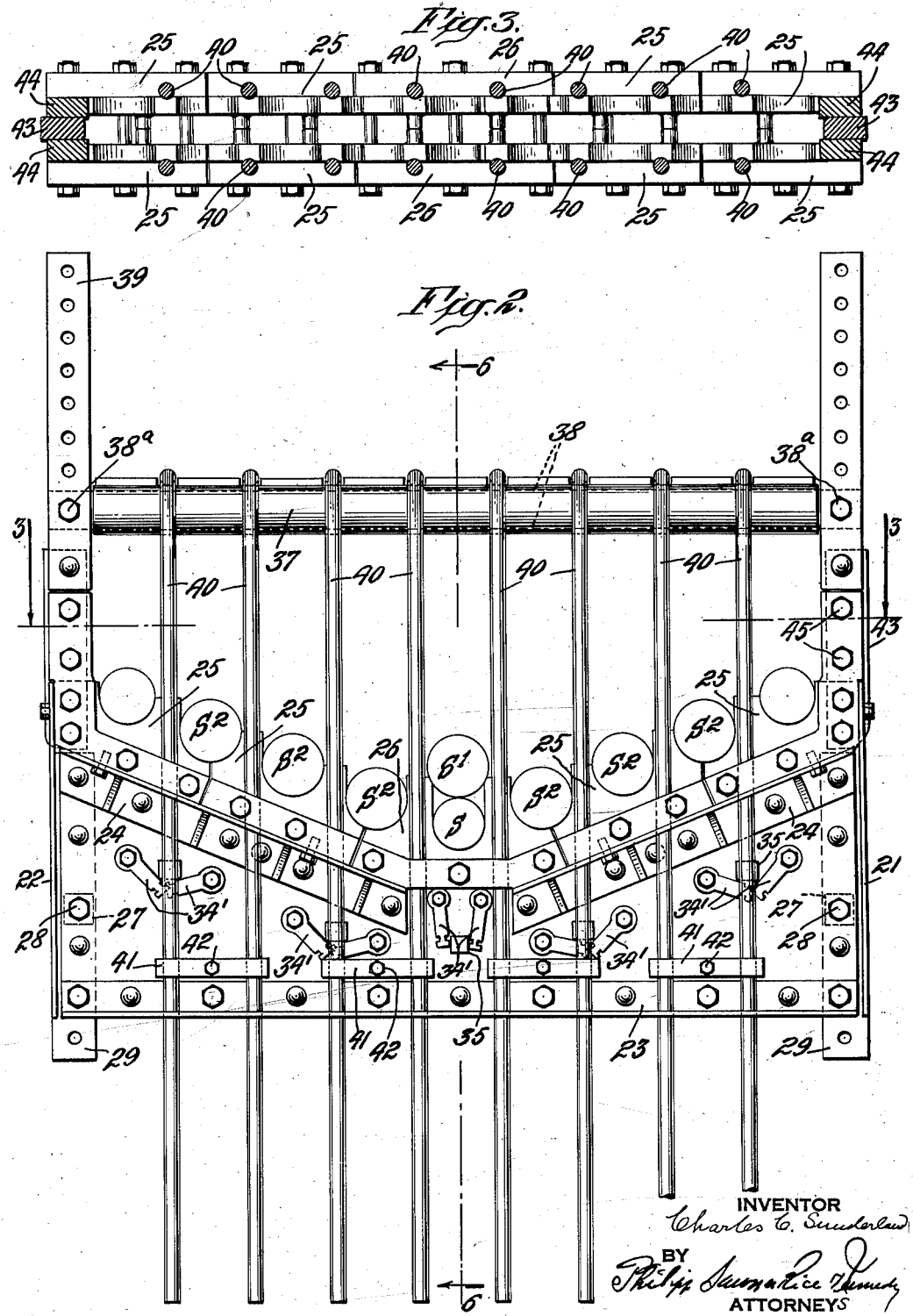

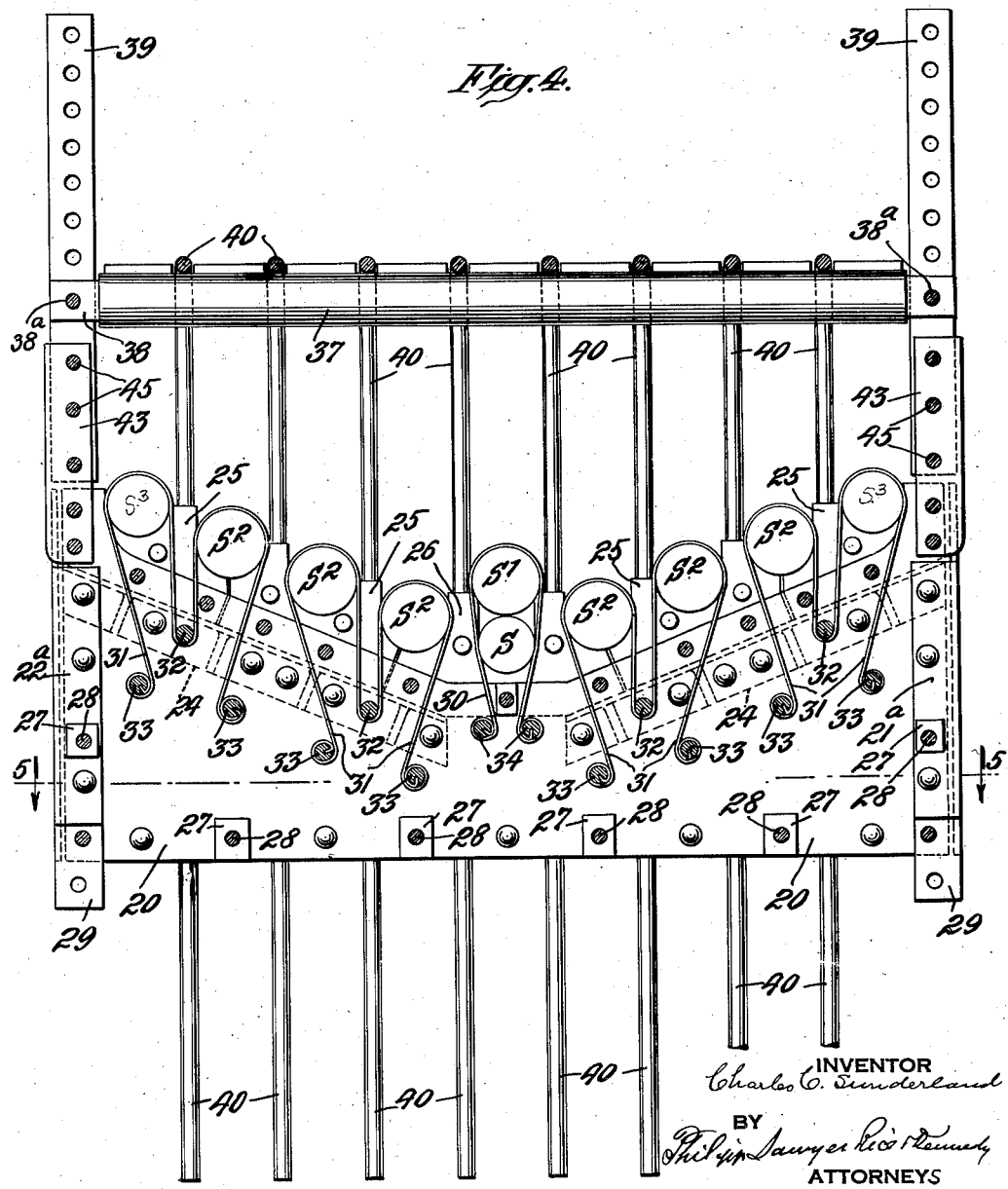

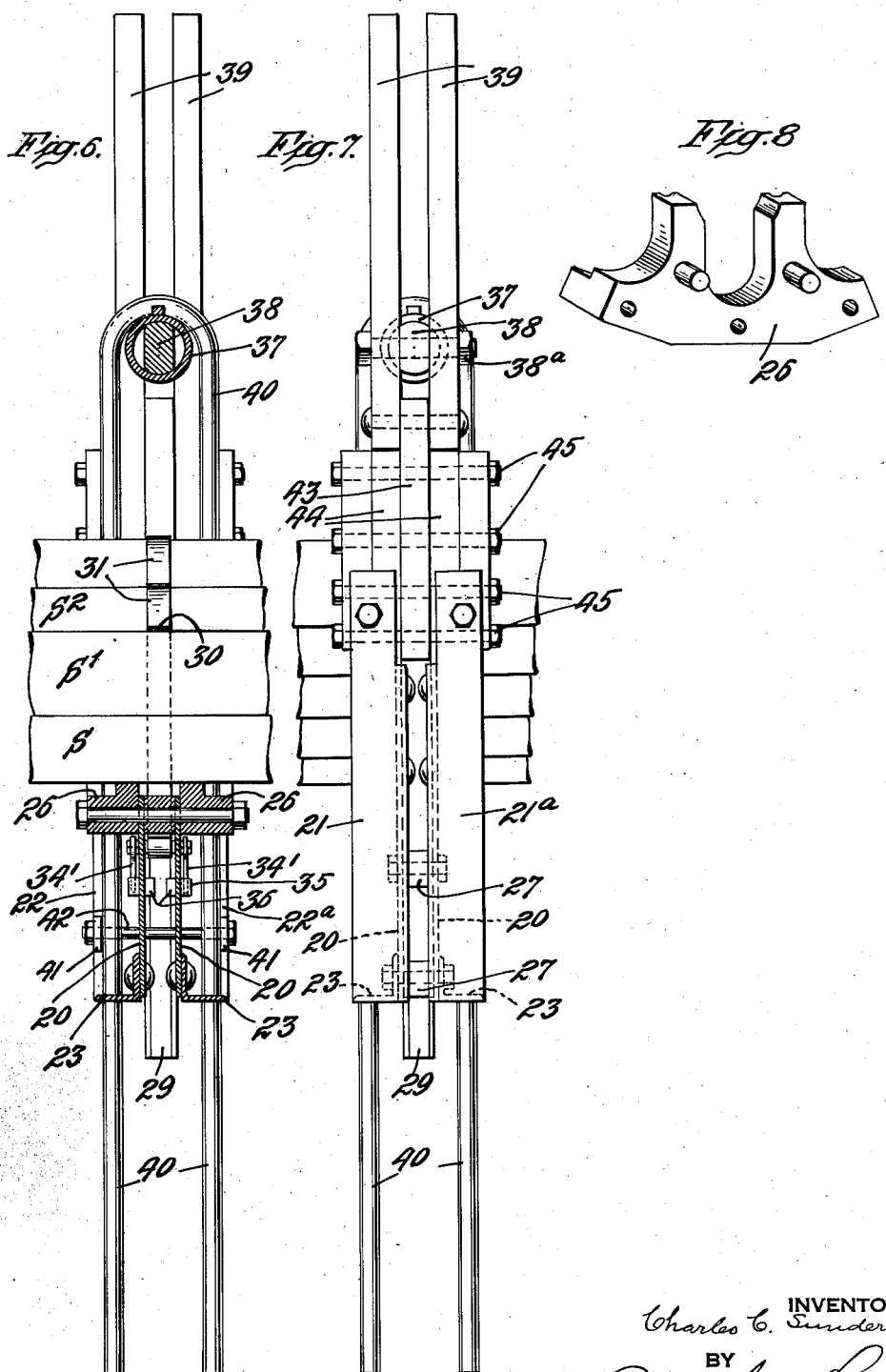

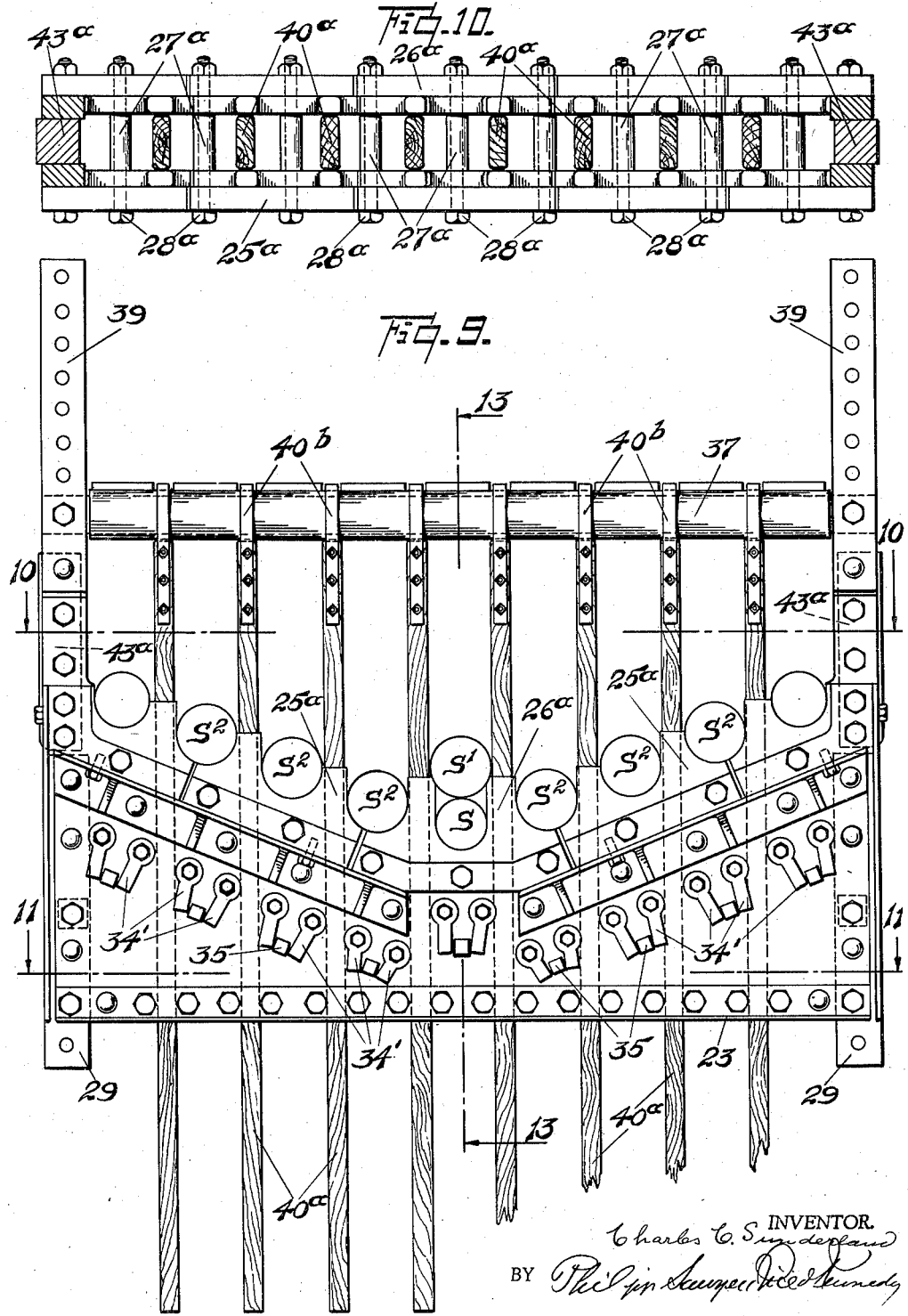

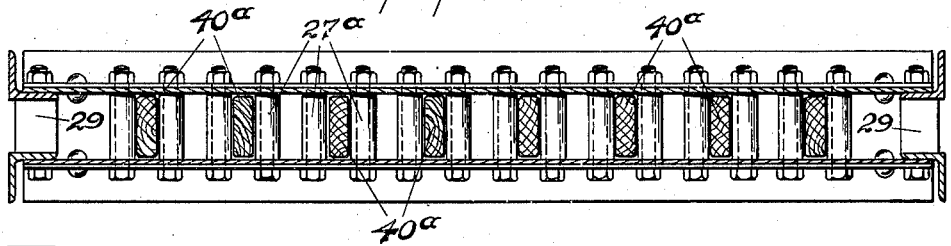
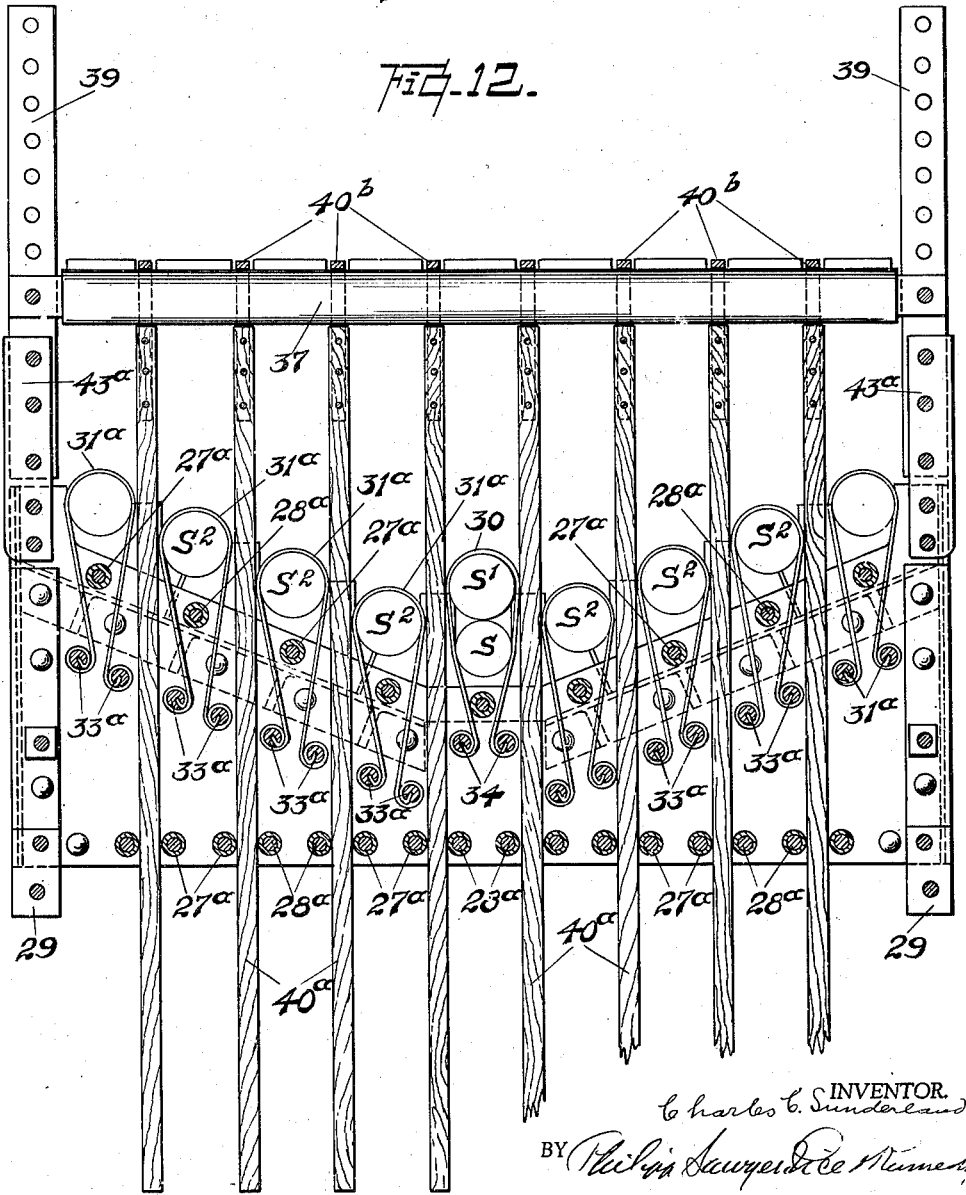

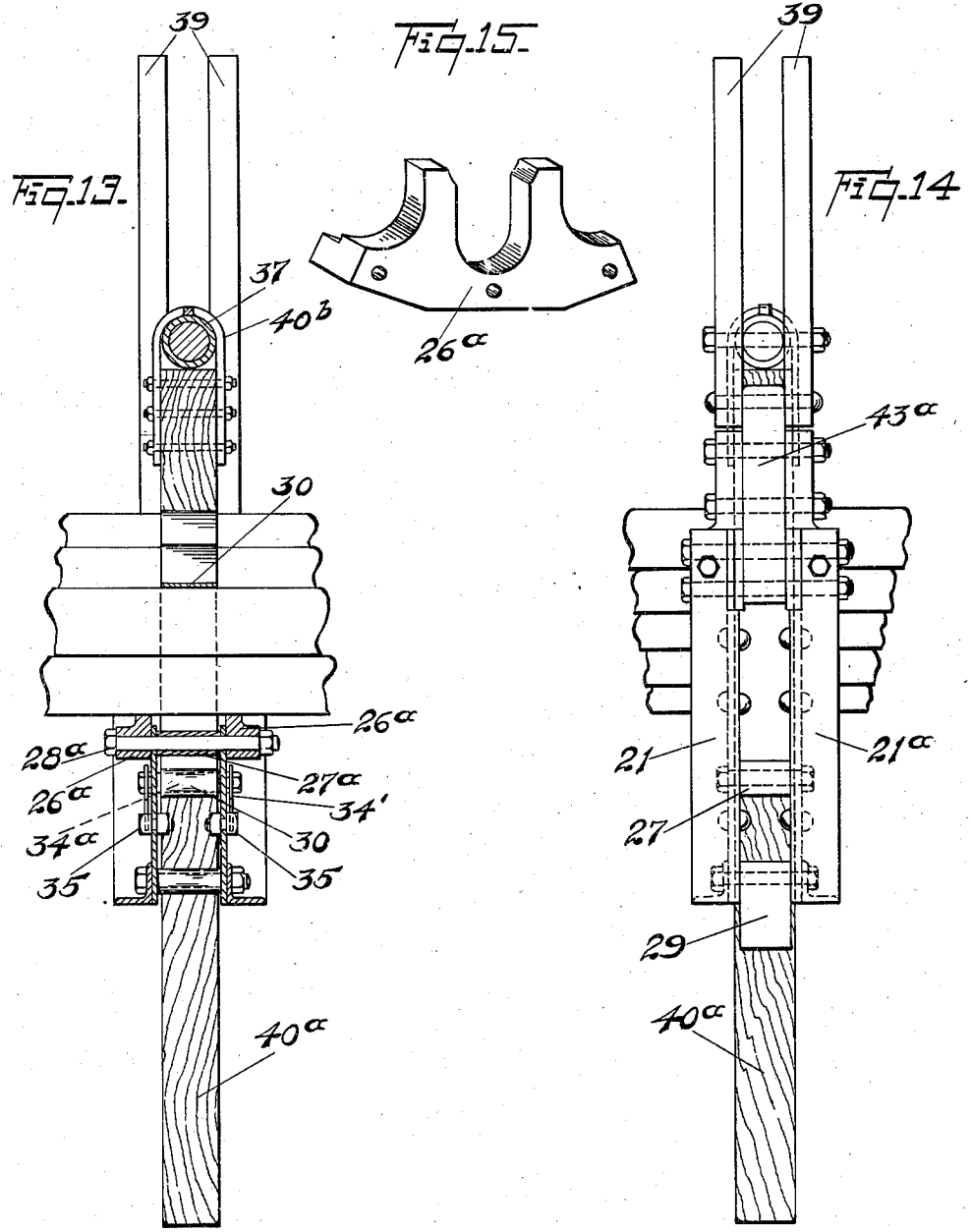

Patented May 31, 1938

2,119,366

UNITED STATES PATENT OFFICE 2,119,366

METHOD OF AND APPARATUS FOR CONSTRUCTING SUSPENSION CABLES

Charles C. Sunderland, New Brunswick, N. J., assignor to John A. Roebling's Sons Company, Trenton, N. J., a corporation of New Jersey Application January 12, 1937, Serial No. 120,168

12 Claims. (Cl. 14—22)

This invention relates to a method of and apparatus for constructing suspension cables of suspension bridges.

There are two general types of suspension bridges, as characterized by the cables themselves, namely, first, that type in which the cable is made from a plurality of strands, each consisting of twisted wires, and, second, that type in which the strands are made of parallel wires. In the former type, the twisted strands retain their identity as strands in the completed cable. In the second type, the strands, when brought together and freed from their binding wires, or bands, deliver their component parallel wires to the cable, as individual wires, which, when compacted, constitute one unitary cable in which the identity of the strands as such, is lost. While the present invention is of advantage in large cables with twisted strands, its greatest importance is in the production of the second type of cable, which when completed is one unitary bundle of parallel wires, because it results in a cable of maximum density of metal, that is to say, with a minimum percentage of voids, or empty space, within the envelope of the cable. It is obvious that where a cable is generally circular in cross-section, and built up from a plurality of wires, also circular in cross-section, there must be, from geometrical considerations, a definite percentage of voids within the enveloping circle of the completed cable, even if all wires make a good tangential contact with each other, so long as the wires retain their circular cross-section. If the wires were hexagonal in cross-section there would be no voids in the cross-section of the cable, except at its periphery within the circular envelope. The percentage area of voids within the enveloping circle of the cable, considered in cross-section, where the cable is made of wires which are circular in cross-section, may be determined from geometrical considerations and this percentage of voids may be considered the ideal to be attained in the construction of a cable. In practice, this ideal has not heretofore been attained, for the reason that some of the individual wires do not reach their allotted positions in the final cable, but are caught in what might be termed an arching of the wires around a central space not occupied by a wire. To the extent that these excess voids occur, the cable is reduced in tensile strength for a given diameter, but this is not the only disadvantage. The most important objection is that the wires which surround such an excess void are subjected to transverse stresses which they otherwise would not have, and this of course, is a disadvantage.

It might be assumed that the loss of tensile strength due to the presence of excess voids, which represents the loss of a certain limited number of wires, might easily be overcome by stringing the same number of additional wires. That this is not true may readily be seen when it is considered that a truly circular cable is the desideratum and that, unless the additional wires are sufficient in number to form a complete annulus around the then circular cable, the result of adding only a few additional wires to a circular cable would be to form a distorted or non-circular cable, that is, a circular cable with a hump at one side, which would be a serious objection.

From the above it follows, that for the proper construction of a parallel wire cable with the minimum voids, the series of strands must be properly positioned in relation to each other, so that upon compacting the strands, the wires of one strand will be properly related to the interstices between any two adjacent strands so as to readily deliver their individual wires to the proper allotted positions in the cable, thereby avoiding so far as possible, any arching of the wires and formation of voids such as occurs when the wires in the strands are not positioned with sufficient accuracy at the start of the compacting operation.

In obtaining this proper positioning of the strands, the old method of arranging the strands in a generally hexagonal form in cross-section with a side of the hexagon horizontal at the bottom of the cable, was improved by arranging the hexagon so that it would have two sides vertical, as disclosed in the patent to Sunderland, 2,011,168, Aug. 13, 1935.

In such a hexagonal arrangement, the strands are in vertical tiers, with the strands in the respective tiers contacting, the central and largest tier being substantially equal to the diameter of the finished cable, and, therefore, requiring little or no displacement of the individual wires during the compacting of the cable. The tiers at each side of the central tier had their respective strands staggered with relation to those of the central tier, so that the strands of one tier would be opposite the interstices of the adjacent tier. By proportioning the numbers of wires in the different strands so that some of the strands were of smaller diameter than others, that is, contained fewer wires, it became possible, theoretically, to compact the strands into a cable with a minimum amount of vertical movement of the centers of gravity of the side strands, wherefore not only were the compacting operations made easier and quicker, but a circular cable of maximum density of metal would be obtained.

It will be understood by those skilled in the art that each strand is connected at the anchorage to suitable devices which, while holding the strand, also permits a limited amount of end adjustment on each strand. As is well known, usually each strand has its individual wires passed around a shoe having a slotted hole, which eventually is pulled by hydraulic jacks into the space between a pair of I bars, and finally fastened to the I bars by a pin; shims being used between the pin and the shoe bearing to adjust the strand to its final position. The strands are spun at a place somewhat removed from the final position of the completed cable, for example at one side thereof, and are then moved to their approximate final positions prior to compacting. Then they are intended to be accurately adjusted to their respective final positions relative to each other, by the use of the aforesaid tensioning means, which gives a relatively small amount of vertical displacement of the strands relative to each other, in case that is necessary.

Since suspension bridges are used only where the span is of considerable length, it is obvious that the strands from which the suspension cable is made have a relatively great length between the towers, and, of course, a greater total length between the anchorages. At the tower saddles, and at the anchorage saddles, the individual strands contact with each other laterally, which, of course, will tend to keep the strands in contact laterally throughout their lengths.

It has been found, when attempting to adjust the strands in their final position, for compacting, that there were temperature differences between strands at the outside and those near the center of the cable, which made it extremely difficult, in view of the great lengths of the strands, to obtain that accuracy of adjustment of the relative positions of the strands which is required for proper compacting into a cable with substantially no voids in excess of the ideal geometrically fixed percentage. The temperature differences were seen to increase with increase of cable diameter, and thus become a limiting factor in the sizes of cables which could be used in practice, because of the impossibility of obtaining and maintaining, prior to and during the compacting operation the required accuracy of adjustment. The result was that, while by the invention of said Patent 2,011,168, a considerable decrease in the excess voids in the cable was obtained, so long as the cable was not too large in diameter, this decrease was only obtained at the expense of considerable care and time in compacting.

It was realized that because of the increase in temperature differences in the strands as the cable diameter increased, it would be impractical to build cables much larger than the largest of the present day, viz.: 36″, although the progress of the art generally pointed to a general and material increase even up to 60 inches, if the proper accurate positioning of the strands prior to compacting could be realized in practice.

By the method of the present invention, all the difficulties arising from temperature differences were overcome in such a way that the method could be carried out during the erection of the bridge without appreciable increase of time of erection and without adding to the load on the foot bridges or erection apparatus.

As applied in connection with the invention of Patent No. 2,011,168, as is preferred, the method involves the arrangement of the strands in vertical tiers, as described in said Patent No. 2,011,168, with, of course, two flat vertical outer sides, as distinguished from the old arrangement of strands in a generally hexagonal form with inclined outer sides and generally flat top and bottom. Therefore, the present method in its preferred embodiment requires, as its first step, the arrangement of the strands in vertical tiers, but differs from the method of said Patent 2,011,168 in maintaining a predetermined separation of the vertical tiers up to the latest possible moment prior to compacting, so as to provide vertical draft channels through which a flow of air can take place readily and thereby bring all the strands to the same temperature and maintain them at the same temperature up to about the time the compacting step begins. Also, while strands are all at the same temperature, the adjusting of the relative lengths of the strands is done, to bring the respective strands into their final accurately adjusted positions prior to compacting. Finally, while the strands are at their equalized temperature and in their substantially accurate positions relative to each other, the compacting step is carried out as rapidly as possible.

For the purpose of holding the strands at certain points remote from the tower supports and anchorages, in proper position, while insuring that the tiers have the proper vertical channels between them, and also permitting the final accurate adjustment of the relative positions of the strands, a new apparatus is provided, which will hereinafter be described specifically in connection with the accompanying drawings, illustrating the best embodiment of the invention.

In the drawings,—

Fig. 1 is a vertical elevation of a cable former in place on a plurality of strands, shown in cross-section, preparatory to compacting the strands into a cable, the apparatus being shown in connection with a timber frame supported by it, this frame being intended to hold and steady the foot bridge system.

Fig. 2 is a vertical elevation of the cable former when initially attached to the first strands, which are in cross-section.

Fig. 3 is a horizontal section on the line 3—3, Fig. 2, looking down.

Fig. 4 is a vertical section through the cable former and strands, illustrating the means for securing the cable former to the strands.

Fig. 5 is a horizontal section on the line 5—5, Fig. 4, looking down.

Fig. 6 is a central section of the cable former on the line 6—6, Fig. 2.

Fig. 7 is a vertical end elevation of the cable former.

Fig. 8 is a detail view hereinafter referred to.

Fig. 9 is a vertical elevation of a modified cable former in place on a plurality of strands, shown in cross-section.

Fig. 10 is a horizontal section on the line 10—10, Fig. 9.

Fig. 11 is a horizontal section on the line 11—11, Fig. 9.

Fig. 12 is a vertical section through the structure shown in Fig. 9.

Figs. 13, 14, and 15 are detail views hereinafter referred to.

Figs. 1 to 8 of the drawings illustrate a device, termed a cable former, which can be considered generally as comprising two main parts, namely, a bottom main section and a top section, the latter comprising two supports arranged to rest on and be detachably connected to the main section, said supports carrying a hanger beam detachably connected to them. On the hanger beam are suspended a plurality of metallic separators arranged to depend from the hanger beam and extend downward between the respective tiers of strands.

The main section is usually constructed as a two-plate girder comprising two plates, 20, Fig. 5, each reinforced at each side edge by a vertically arranged angle, 21, 21a, 22, 22a, each of which projects above the top edge of the plate, for a purpose hereinafter described. The lower edge of each plate 20 is also reinforced by a heavy angle 23, 23a.

The upper edges of the plates 20 are not horizontal but slope upward each way from the center in order to conform generally to the shape of the lower configuration of the cable before compacting, that is to say, of the bottom strands in their position ready for compaction in the completed cable, as indicated in Fig. 2. The upper edges of the two plates are reinforced by filleted angles, 24, and above this by a series of pairs of cast steel bearing blocks, 25, 26, the center ones, 26, (one of which is shown in Fig. 8) being arranged to receive a small strand, indicated at S, Fig. 2, and above it a larger or normal sized strand, $S_1$, while the bearing blocks 25 at each side of the center one are arranged to receive the respective remaining bottom strands. The plates of the girder are spaced apart by suitable separators, 27, and held together by suitable means such as bolts, indicated at 28.

Each of the bottom outer corners of the girder is provided with a depending hanger, 29, to which the foot bridges may be connected to reduce the lateral swaying of the latter from the effect of wind, the connection being made through a suitable truss, as indicated in Fig. 1, at X.

The upper outer corners of the plate girder are arranged to be connected to an upper framework as will be more fully explained hereinafter.

With the particular type of cable illustrated in the drawings there are nine bottom strands, six of normal size, indicated at $S_2$, and two side strands $S_3$, and one central strand, S, somewhat smaller than the others, all of which are spun at one side or the other of their final positions and then drawn together to their final positions and properly adjusted by the tensioning devices at the anchorages. Then another normal size strand, $S_1$, is spun and moved into place directly over and in contact with the small central strand, S, of the set of bottom strands, this strand, $S_1$, also being properly adjusted by its tensioning devices.

When these ten strands have been brought to their final positions, the plate girder is lifted into position beneath the strands and raised until its bearing blocks, 25, 26, make a firm contact with their respective strands. Then the plate girder is firmly secured to the ten strands so that the plate girder, and the upper framework which it is to carry will be supported wholly by the said strands. While the connection of the plate girder to the said strands may be accomplished in various ways, the best way is by means of flexible steel straps; a central one, 30, which passes over the two strands, S and $S_1$, and four straps, 31, each of which passes over two side strands, $S_2$, has its central portion looped down between the two side strands to engage a fixed pin, 32, carried by the girder, and has its two ends wound on rotatable pins, 33, extending transversely through the two plates of the girder, each pin having a hexagonal head outside the plates for the application of suitable wrenches for winding up the respective strap end. The central strap, 30, has its two ends wound on similar pins, 34. In order to lock the rotatable pins in their final position, suitable means is provided. In the best embodiment of the invention there is provided for each end of each pin 33, 34, a locking plate device, 34, which has a 6-sided polygonal hole to fit on the hexagonal head of its pin, and an arm which may be retained against unwinding movement by the square head of a machine bolt, 35, passing through the respective girder plate and threaded into a nut, 36, one for each bolt as will be clear from Fig. 6. The connection of the plate girder to the strands forming the bottom of the cable insures the proper positioning of all the strands resting in the shoes, 25, 26, carried by the girder, and maintains the strands against lateral displacement relative to each other.

When the plate girder is secured firmly to the strands, a top section or frame, carrying a removable transverse hanger beam, is detachably connected to the sides of the plate girder and from the hanger beam are suspended metallic separators which depend from the hanger beam and extend vertically in the interstices between the strands already formed. In the best embodiment of the invention the hanger beam is a hollow cylinder, such as a pipe, 37, carried by a flat bar, 38, extending through it and connected at its ends to the side standards, 39, of the upper frame. The metallic separators, 40, may be variously constructed, but in the best embodiment, are each shaped as a hair pin, that is, has two legs connected only at the top by a curved portion integral with the legs. These separators, 40, straddle the pipe, 37, of the hanger beam and may, if necessary, be held to the plate girder by suitable means near the bottom of the girder, as for example, by inserting the respective legs through corresponding holes in the respective outward extending flanges of the reinforcing angles, 23, 23a, at the bottom of the girder, and by clamp devices, 41, secured at each side of the girder by means of bolts, 42, as indicated in Fig. 1.

The top frame consists of two side standards, 39, each of which consists of two bars arranged to be connected together and spaced apart by separators, each standard being detachably secured to the upper outside corners of the plate girder, as for example, by a splice joint comprising a tongue 43, and two fish-plates, 44, the tongue entering between the two plates of the plate girder. The tongue and fish-plates are held by bolts, 45, as shown in Fig. 7. Each of the side-standards, 39, is provided with a series of bolt-holes transverse to the plate of the plates of the girder, for a purpose explained below.

The hanger beam, as hereinbefore stated, comprises a flat bar, 38, each end of which extends between the two bars of its respective side standard, 39, and may be held by a bolt, 38a, passing through the said end and through the corresponding holes in the two bars of the side standard. Because each side standard has a series of holes, the flat bar, 38, may be adjusted up or down in the upper frame, as required, in order to keep the hanger beam close to the strands assembled in the cable-former, and yet allow it to be raised as more strands are added to those already in place in the cable-former.

On the hanger beam the metallic separators are hung so as to depend between the strands already in place, the separators being of such length as to hang down considerably below the bottom of the plate girder when first put in place.

In ordinary practice, there are a number of cable formers secured to the initial strands, at suitable intervals, usually four hundred feet. After a cable-former has been attached to the initial strands of the cable, it may have a frame secured to it and to the transverse beams connecting the foot-bridges, in order to minimize the swaying of the foot-bridges, due to the action of the wind. Such a frame is illustrated at X, Fig. 1, and it is bolted to the plate girders so as to be suspended from the cable-former and from the strands which support the latter. It is also desirable to provide a guard frame over the hanger, as indicated at Y, Fig. 1, to insure that wires while being spun will not swing down onto the top of the cable-former. The guard frame may be of wood, as shown, and is bolted to the cable-former, its upper part being an inverted V.

When the first strands are enclosed in the cable-formers, in contact with their respective bearing shoes, as illustrated by Fig. 2, the remaining strands are spun, usually four at a time, two at each side of the cable-formers. Then the bolts are removed from the hanger beams, and the splice joint at each side of the frame is unbolted to permit the side standards and the hanger beam to be removed, while allowing the metallic separators to remain erect between the strands already in place, the said separators being held by the clamps, 41.

The two newly spun strands are swung into place at their predetermined position on top of the respective strands already in place. The cable former is closed again by replacing the hanger beam and the side standards which had been removed to allow the endwise removal of the hanger beam from beneath the loops of the metallic separators. The final adjustment of the two new strands may now be done by adjustment of the tensioning devices at the anchorage, in the usual way.

Further new strands are spun, moved into place in the cable formers and adjusted, in the same manner as already described for the first two additional strands, the hanger beam and the metallic separators being raised as the height of the pile of strands increases. By keeping the hanger beam close to the top of the pile of strands, it may be used as an abutment for wooden blocks and wedges, which may be used to press down the then uppermost strands. The cable-formers serve to hold a pile of strands as a solid unit during erection of the pile of strands.

The separators are so dimensioned that the vertical channels between the respective tiers of strands, determined and maintained by the separators, will insure a ready flow of air upward or downward, according to air conditions outside the pile of strands, so that a uniform heating or cooling of the separate strands will be insured, thus making certain that all strands will have the same temperature, or quickly come to that condition, which temperature, of course, is dependent upon the temperature of the air. This provision for a free flow of air has been found to be very important, because as the pile of strands grows, the strands inside the pile are not exposed to the heat of the sun as are the outer strands, so that the latter may tend to warm up more rapidly than the inner strands, whereas at night, if the air cools down with some rapidity, the outside strands would tend to cool more rapidly than the inner strands of the pile, were it not for the properly dimensioned vertical air channels between the tiers of strands, which insure a rapid circulation that tends to prevent any differences of temperature. Because of the maintenance of uniform temperature in all the strands, two important results are obtained: First, there can be attained that close approach to absolute accuracy of positioning of the strands relative to each other, which is required prior to compacting the strands into a cable, if the minimum of voids is to be attained, and, second, the adjustment of the individual strands in their final adjusted position may be done promptly and rapidly as soon as such strands are swung into place in the pile of strands.

In order to avoid the danger of any chafing of the strands, by the metallic separators, the legs of these may be covered with material softer than iron or steel. It has been found that the best material is zinc, which may be applied in a molten condition and, when set, forms a coating, which, if any rubbing takes place, will polish to a bright surface, rather than wear away.

A great advantage of the hair-pin shape of the metallic separators is that it provides two points of separation of the strands and thus distributes any lateral thrust of the strands, rather than concentrating it at one point. The shape of the metallic separators also makes easy their support on the hanger beam. Also, the metallic separators are readily raised or lowered without being freed from the hanger beam. Finally, because the metallic separators are heat conductors and make a close contact with the respective strands and are in the vertical air channels, they constitute good radiating elements to assist in equalizing the temperatures of the strands.

After the strands have been finally adjusted as accurately as possible to the relative positions requisite to insure a minimum of voids in the compacted cable, the compacting apparatus is put in place around the associated strands, at a place between two adjacent cable-formers. Then the compacting and finishing of the cable, as by banding, serving and the like, is begun and carried on in the usual way. The compacting is done by compression of the strands by lateral, and generally horizontal, pressure from the outside of the cable toward its center, any bands which may be on the individual strands being either cut or broken or stretched by the crushing of the strands due to the compacting force, or cut and removed. This removal, cutting or stretching of the bands on the strands, is intended to free the individual wires of the strands so as to permit them to assume their proper positions in the cable, and because of the prior accuracy of positioning, allows the wires to be forced to their final positions in the compacted cable, with little or no opportunity for any arching of the wires, considered in cross-section, and, therefore, no formation of unnecessary voids. The compacting is carried on from the original point of commencement on the cable toward an adjacent cable-former, which is left in place until the compacting has nearly reached it, thus maintaining the proper position of the strands as long as possible. The cable-former nearest the point of compacting, in the direction in which the compacting is being done, is removed by disconnecting any connections to the foot bridges, opening the upper framework, withdrawing the metallic separators in an upward direction, unfastening the plate girder from the bottom strands to which it has been connected and removing it from the field of operations. Then the compacting proceeds along the cable, passing over the cross-section where the cable-former had been and going on toward the next one. Under some conditions where the strands may be subjected continuously to very high winds which might cause undue chafing against the separators, it may be advisable to use wooden, instead of the metallic, separators of the former hereinbefore described. This necessitates a modification of the cable-former, because it is advantageous, with a wooden separator, to have it made in one piece instead of with two legs as in the hair-pin shaped metallic separator. Consequently the two plates of the girder of the cable-former are spaced farther apart to allow the wooden separators to hang down from the strands in the space between such plates. Also, the spacers of the girder, must be so located as to be out of the path of the wooden separators, and, also, the flexible steel straps, which support the cable-former from the strands, must not be in the way.

A cable-former of this type is illustrated in Figs. 9 to 15, inclusive. This differs from the construction shown in Figs. 1 to 8, inclusive, in having relatively long spacers, indicated at 27a, Fig. 10, through which pass the bolts 28a, these bolts being so located as to be out of the paths of the respective wooden separators, indicated at 40a, which hang down between the two plates of the girder. The bearing blocks, 25a, and 26a, differ from those of the prior construction (25 and 26) in having no projecting pins or lugs on their inner faces, as will be seen by comparing Figs. 8 and 15.

In the previously described cable-former the centrally arranged flexible strap 30 passed over the two strands S and S¹ and had its rotatable pins, 34, located close together. In the modified cable-former this central strap and its pins are retained. However, the flexible straps for the side strands in the modified cable-former do not each pass over two strands, but there is a flexible strap for each side strand, as indicated at 31a, each having its two ends arranged to be wound on its own pair of rotatable pins, one for each end of its strap, each pair of pins, indicated at 33a, being located under its respective strand so as to leave a clear path between the tiers of strands for the reception of the respective wooden separators. The means for locking the rotatable pins against backward rotation is the same as before.

On account of the wider separation of the plates of the girder, the tongues of the splice joints, indicated at 43a, Fig. 10, are wider than the corresponding tongues, 43, of the previously described cable-former. Each of the wooden separators, 40a, is of about the same thickness as the diameter of the metallic separators previously described, but its width, in the direction of the length of the strands, is considerably greater in order to give a good lateral bearing for the respective strands in contact with it. In the embodiment illustrated the width is about three times the thickness.

Each separator is made of suitable wood, most advantageously hard wood, such as hickory, hard maple, oak, or some hard tropical wood. In order to detachably support each separator from the hanger bar, each is provided with a stirrup, or loop, 40b, at its upper end, this loop being secured to its separator by bolts passing through the separator and provided with nuts, as will be clear from Figs. 9, 13 and 14.

The manner of using the modified cable-former is the same as was described hereinbefore except that no especial means is provided for locking the separators in place between the strands when the hanger bar is to be removed, it being found that this is unnecessary because of the greatly increased friction between the strands and the wide wooden separators.

It will be seen that in carrying out the method of this invention, the suspension bridge cable is formed by grouping a plurality of strands in proper adjusted positions relative to each other, with the strands arranged to provide continuous ventilation for them during the grouping operation, and thereafter compacting the strands to form the cable, the ventilation of the strands being maintained until just before the compacting operation, and in the best embodiment of the invention the final adjustment of the position of each strand may be made just after it is introduced into the group and in the order in which it is so introduced. This method makes it possible to obtain and maintain a substantially uniform temperature of the strands, which permits an accurate and more rapid positioning of the strands relative to each other, and results in the production of a compacted cable with a minimum of excess voids.

It is to be understood that the invention is not limited to the particular example specifically described, the full scope of the invention being pointed out in the claims.

What is claimed is:

1. The method of constructing a suspension bridge cable, which consists in spinning a plurality of initial strands, moving said strands into position to form a group of strands out of contact with each other laterally to provide spaces between said strands, then spinning additional strands, moving them into position to make contact vertically with the respective initial strands in the group of initial strands, while maintaining said additional strands out of contact with each other laterally, thereby forming spaces in line with the spaces between the initial strands to constitute vertical air channels, continuing the spinning of further strands, the moving of them into position to make contact vertically with the strands previously placed while maintaining all strands out of lateral contact, whereby vertical tiers of strands are produced with vertical air channels between the tiers, adjusting each strand as placed in position in the group to bring it to its required vertical position for compacting, maintaining the vertical air channels until all strands are in the group and adjusted to their said respective vertical positions, and finally progressively compacting all the strands to form a cable, while maintaining the vertical air channels in the uncompacted portions of the cable remote from the place of compacting until just before being reached by the progression of the compacting operation.

2. The method of constructing a suspension bridge cable, which consists in spinning a plurality of initial strands, each consisting of a plurality of parallel wires, moving said strands into position to form a group of strands out of contact with each other laterally to provide spaces between said strands, then spinning additional strands of parallel wires, moving them into position to make contact vertically with the respective initial strands in the group of initial strands, while maintaining said additional strands out of contact with each other laterally, thereby forming spaces in line with the spaces between the initial strands to constitute vertical air channels, continuing the spinning of further strands of parallel wires, the moving of them into position to make contact vertically with the strands previously placed while maintaining all strands out of lateral contact, whereby vertical tiers of strands are produced with vertical air channels between the tiers, adjusting each strand as placed in position in the group to bring it to its required vertical position for compacting, maintaining the vertical air channels until all strands are in the group and adjusted to their said respective vertical positions, and finally progressively compacting all the strands to form a cable substantially free from excess voids, while maintaining the vertical air channels in the uncompacted portions of the cable remote from the place of compacting until just before being reached by the progression of the compacting operation.

3. The method of constructing a suspension bridge cable, which consists in spinning a plurality of initial strands, moving said strands into position to form a group of strands out of contact with each other laterally to provide spaces between said strands, maintaining said spaces by vertical separators of heat-conductive material supported by the said strands and extending above and below said strands, then spinning additional strands, moving them into position to make contact vertically with the respective initial strands in the group of initial strands, while maintaining said additional strands out of contact with each other laterally, and in contact with the respective separators, thereby forming spaces in line with the spaces between the initial strands to constitute vertical air channels whose width is determined by the separators, continuing the spinning of further strands, the moving of them into position to make contact vertically with the strands previously placed while maintaining all strands out of lateral contact, whereby vertical tiers of strands are produced with vertical air channels between the tiers, of a width determined by the separators, adjusting each strand as placed in position in the group to bring it to its required vertical position for compacting, maintaining the vertical air channels until all strands are in the group and adjusted to their said respective vertical positions, and finally progressively removing the separators and compacting all the strands to form a cable substantially free from excess voids, while maintaining the separators in position to maintain the vertical channels in the uncompacted portions of the cable remote from the place of compacting until just before being reached by the progression of the compacting operation.

4. The combination, with a plurality of initial strands of a suspension bridge cable, of a plurality of separator bars extending between the adjacent initial strands, and thereby determining the spacing laterally of said initial strands, and means carried by said initial strands for holding the separator bars in a substantially vertical position, said separator bars projecting above the initial strands.

5. The combination, with a plurality of initial strands of a suspension bridge cable, of a plurality of separator bars extending between the adjacent initial strands, and thereby determining the spacing laterally of said initial strands, a cable-former secured to more than one of said initial strands and comprising a girder arranged beneath the strands, a hanger beam above the strands removably attached to said girder, said hanger beam being arranged to support the said separator bars when it is in place, and releasable means carried by the girder for holding the separator bars below the strands when the hanger bar is removed, said separator bars projecting above the initial strands to receive additional strands between them.

6. The combination, with a plurality of initial strands of a suspension bridge cable, of a cable-former comprising a girder secured to at least two of said initial strands so as to be supported thereby, standards connected to the girder at each side of the initial strands, and a hanger beam detachably connected to the standards, a plurality of separator bars, each having two legs connected at the top, said separator bars straddling the hanger beam and depending therefrom, the lower ends of the two legs of each separator bar entering between adjacent initial strands, to determine the spaces between the initial strands, said separator bars extending vertically above and below the initial strands, and a clamping means for each separator bar carried by the girder below the initial strands whereby the separator bars may be held in place, when the hanger beam is removed to admit the placing of additional strands of the suspension cable.

7. The combination, with a plurality of initial strands of a suspension bridge cable, of a plurality of metallic separator bars extending between the adjacent initial strands, and thereby determining the spacing laterally of said initial strands, each of said separator bars having a coating of metal softer than iron, and means carried by said initial strands for holding the separator bars in a substantially vertical position, said separator bars projecting above the initial strands.

8. The combination, with a plurality of initial strands of a suspension bridge cable, of a cable-former comprising a girder secured to at least two of said initial strands so as to be supported thereby, standards connected to the girder at each side of the initial strands, and a hanger beam detachably connected to the standards, a plurality of steel separator bars coated with zinc, each having two legs connected to the top, said separator bars straddling the hanger beam and depending therefrom, the lower ends of the two legs of each separator bar entering between adjacent initial strands, to determine the spaces between the initial strands, said separator bars extending vertically above and below the initial strands, and a clamping means for each separator bar carried by the girder below the initial strands whereby the separator bars may be held in place, when the hanger beam is removed to admit the placing of additional strands of the suspension cable.

9. An apparatus for use in constructing suspension bridge cables from a plurality of separately spun strands, comprising a double plate girder having bearing blocks on its upper side arranged to bear against the strands initially spun and brought together in a group, flexible straps arranged to loop over the initial strands, means carried by the girder for tensioning and holding said straps so that the girder may be suspended from the initial strands, side standards detachably secured to the ends of the girder, a hanger beam detachably secured at each end to said standards and adjustable vertically on said standards, a plurality of metallic separator bars, each having two legs connected at the top, said separator bars straddling and depending from the hanger beam, and releasable clamping means for each separator bar, carried by the girder and arranged to clamp the lower portion of the respective separator bars.

10. An apparatus for use in constructing suspension bridge cables from a plurality of separately spun strands, comprising a double plate girder having bearing blocks on its upper sides arranged to bear against the strands initially spun and brought together in a group, means for suspending the girder from said initial strands, side standards detachably secured to the ends of the girder, a hanger detachably secured at each end to said standards and adjustable vertically on said standards, a plurality of wooden separator bars depending between the plates of the girder and arranged to enter the respective spaces between the tiers of strands, and means for supporting each separator bar from the hanger bar while permitting endwise removal of the latter.

11. The method of reducing the voids due to differences of temperature in constructing suspension bridge cables, which consists in grouping a plurality of strands with the strands arranged to provide continuous ventilation of the strands during the grouping of them, maintaining such ventilation until just before the compacting operation, and then compacting the strands to a unitary cable, whereby a substantially uniform temperature of the strands is obtained and maintained for compacting.

12. The method of constructing suspension bridge cables, which consists in grouping a plurality of strands with the strands arranged to provide continuous ventilation of the strands during the grouping of them, adjusting the strands to their final positions in the group in the order in which each has been brought into the group, maintaining such ventilation until just before the compacting operation, and then compacting the strands to a unitary cable, whereby a substantially uniform temperature of the strands is obtained and maintained for compacting and an accurate positioning of the respective strands is insured.

CHARLES C. SUNDERLAND.